United States Patent [19]
Riach, Jr.

[11] Patent Number: 5,389,981
[45] Date of Patent: Feb. 14, 1995

[54] EYEGLASSES HAVING MAGNETS ATTACHED THERTO FOR IMPROVING THE BLOOD CIRCULATION OF THE EYES

[76] Inventor: George Riach, Jr., 10424 Cary Cir., Cypress, Calif. 92651

[21] Appl. No.: 79,893

[22] Filed: Jun. 22, 1993

[51] Int. Cl.$^6$ ................................................. G02C 1/00
[52] U.S. Cl. ...................................... 351/158; 351/41; 600/9
[58] Field of Search ................... 351/41, 52, 140, 158; 606/33; 607/1; 600/9, 15

[56] References Cited

U.S. PATENT DOCUMENTS

| | | | |
|---|---|---|---|
| 2,920,327 | 1/1960 | Singer | 351/52 |
| 4,070,103 | 1/1978 | Meeker | 351/154 |
| 4,988,181 | 1/1991 | Riach, Jr. | 351/52 |
| 5,096,284 | 3/1992 | Nakamats | 351/156 |

FOREIGN PATENT DOCUMENTS 846425  8/1960  United Kingdom ................. 351/52

Primary Examiner—William L. Sikes
Assistant Examiner—Huy Mai
Attorney, Agent, or Firm—Francis X. LoJacono

[57] ABSTRACT

The invention defines an eyeglass having a frame structure that includes a frame member having openings in which glass lenses are mounted, wherein the frame structure of the eyeglass is employed as a support device for one or more permanent magnets that are selectively positioned on the frame or lenses so that magnetic energy is focused on the eyes for stimulating and increasing the blood circulation in the general area of eyes when worn by the user thereof.

11 Claims, 1 Drawing Sheet

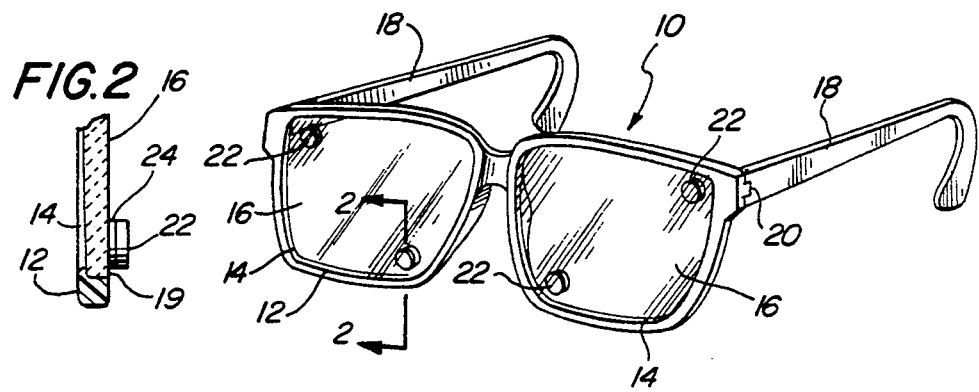
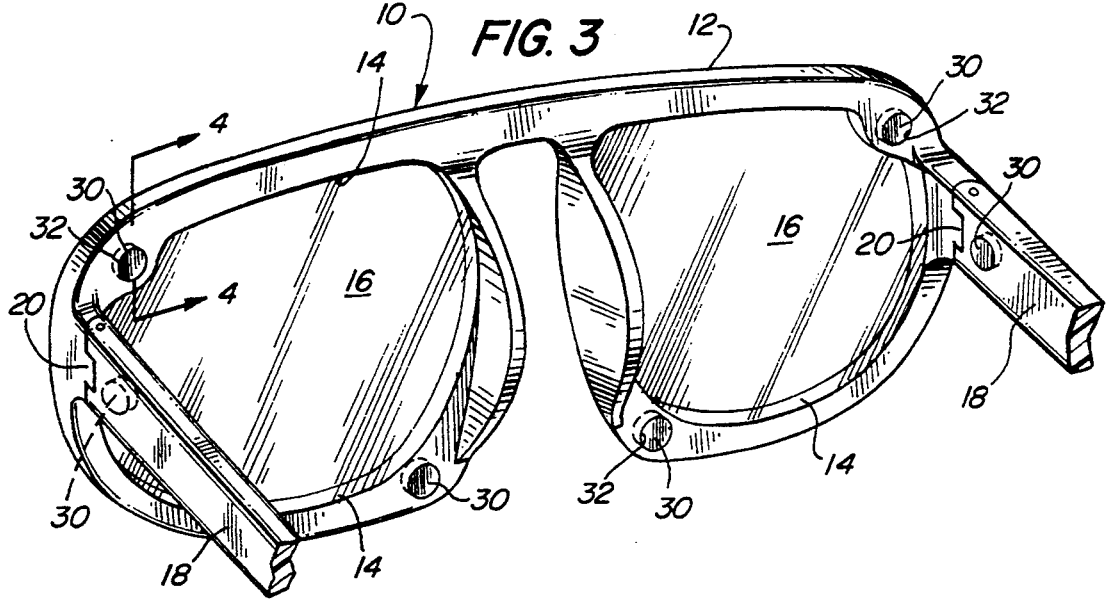
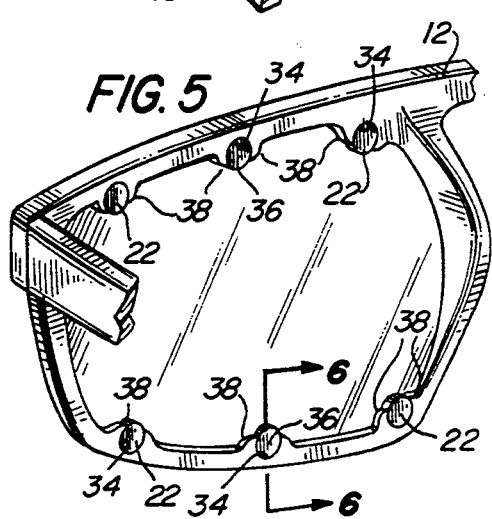
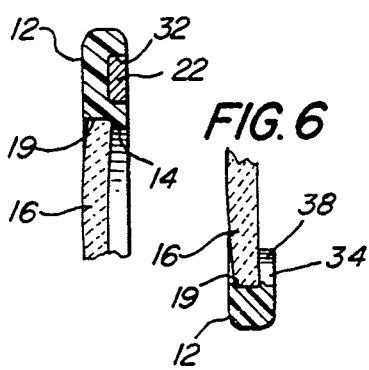

EYEGLASSES HAVING MAGNETS ATTACHED THERTO FOR IMPROVING THE BLOOD CIRCULATION OF THE EYES

BACKGROUND OF THE INVENTION

1. Field of the Invention

This invention relates to eyeglasses and more particularly to eyeglasses employed as a magnetic support device that includes one or more permanent magnets that are selectively positioned on the frame or lenses so that magnetic energy is focused on the eyes for improving the blood circulation within the surrounding area of the eyes.

2. Description of the Prior Art

Although magnetic field therapy has been known for some time, recent developments have opened many areas in the health fields for magnetic therapy which involves the use of unipolar magnets having opposing north and south poles and closely spaced surfaces of various sizes which may have substantially different lengths, widths or diameters. Such magnets are now available both in rigid form, as ceramic magnets, and in any desired length, width, thickness and diameter to meet the many needs that might be required in new fields of technology.

A book entitled "New Hope for Physical and Emotional Illness" by William Howard Philpott, M.D., and Walter C. Rawls, Jr., D. Sc., which is available through ENVIRO-TECH PRODUCTS, 17171 S.E. 29th Street, Choctaw, Okla. 73020, discusses the use of unipolar magnets and particularly the effects of using the north (or negative) and south (or positive) poles.

It is well established that the north and south poles of unipolar magnets provide quite different effects on living metabolic systems. These effects can be briefly summarized in Table "A" as follows:

TABLE "A"

| NORTH POLE ENERGY | SOUTH POLE ENERGY |
|---|---|
| Stimulates alkali metabolic response | Stimulates acid metabolic response |
| Slows down metabolic process | Speeds up metabolic process |
| Reduces or stops pain | Increases pain |
| Dissolves calcium deposits around arthritic joints | Can increase symptoms |
| Can slow heart function and produce bradycardia | Can step up heart function; produce a fast heartbeat |
| Reduces multiplication of microorganisms and helps the body fight infection | Speeds up multiplication of microorganisms and can be injurious to infections |
| Increases oxygenation of tissue-indirect evidence | Decreases oxygenation of tissue-indirect evidence |
| Supports the biological healing process | Decreases the biological healing process |
| Increases mental alertness | |

It is apparent from this tabulated data that therapeutic benefit is derived primarily from exposure to the north pole energy, and that extended exposure to south pole energy should be avoided. It should be noted, however, that in some situations, and under professional guidance, it can be desirable to alternate between north pole and south pole energy, or to simultaneously apply different polar energy to different portions of an afflicted site.

Extensive research has been done on magnet therapy in Japan as well as in the West. It has been shown to be extremely effective and a treatment of choice in many hospitals and clinics. Excellent work has been done in America by many scientists and medical professionals, among them Dr. A. Roy, Walter C. Rawles, Albert Roy Davis, and by Professor M. F. Barnothy. They have been able through extensive and repeated experiments to prove that magnetic currents positively influence metabolism and support the formation of amino acids (the building blocks for protein) in cells.

In recent years Dr. 0. W. Stark and Dr. P. Kerdaniel analyzed several scientific reports dealing with magnet therapy, among them studies done at the University of Tokyo Medical School. They came up with surprising results: approximately eighty per cent of the patients reacted positively to therapy.

Glaucoma (excessive pressure buildup in the eye) is a leading cause of blindness. Professor Holger Hannemann, a respected Swiss naturopath, describes how glaucoma can be alleviated by the use of magnets placed near the eye (with the north pole toward the eye).

One mechanism of intraocular pressure elevation is a malfunction of the central and the autonomic nervous system, which interferes with the flow of fluids. Another mechanism is a blockage of the outflow facility of the aqueous humor of the eye. Aqueous fluid is produced inside the eye at the rate of 2 micro-liters per minute, and the eye must be able to drain fluid from the eye at this rate to avoid a pressure buildup. Any blockage is essentially a clogging of the fluid pathways, and the effectiveness of a magnetic field in facilitating the flow may be in its ability to breakup clumping of leucocytes and lymphocytes in the lymphatic drainage system.

Any disruption of the retinal vessel network will impair vision by interfering with the clear transmission of images. Most retinal disorders are due to degenerative vascular changes, and many of these changes are thought to be secondary to toxic blood factors.

In all cases, proper blood flow is crucial to proper retinal function, and any enhancement of blood flow will benefit the health of the eye and vision in general. Studies have shown that people who smoke tobacco experience a clumping of blood cells in the blood vessels of the eye, clogging up the vital nutrient supply routes. Another concern is among contact lens wearers, who deprive the cornea of access to molecular oxygen by placing a plastic semipermeable barrier (the lens) on top of the cornea. The cornea is one of the few entirely vascular tissues of the body, and since the vessels can not reach the tissue cells of the cornea they are dependent on absorption of oxygen from the air and the aqueous fluid. Applying a proper magnetic field may facilitate this absorption.

Certain magnetic fields (such as from computers and televisions) are known to be harmful, while other fields (such as from permanent magnets) are known to beneficial.

In a review of the art only two patents U.S. Pat. Nos. 5,096,284 and 5,120,119, both issued to Yoshiro N. Mats, teach the use of permanent magnets that are mounted on the rear portion of the ear pieces of eyeglasses so as to be positioned rearwardly of the ears adjacent the back of the head of the wearer, suggesting that the permanent magnets may influence the flow of blood under the skin of the user's head.

U.S. Pat. No. 2,920,327 to M. Singer teaches a pair of glasses with a magnetic strip that is used to snag airborne particles.

U.S. Pat. No. 4,070,103 to Martha C. Meeker, teaches a pair of eyeglasses with a magnetic rim that allows the wearer of eyeglasses to change a single pair of glasses to match any individual fashion or mood.

U.S. Pat. No. 3,583,192 to Manual M. Gitlin teaches detachable decorative sleeves for spectacles.

U.S. Pat. No. 4,988,181 to George Riach, Jr., teaches the mounting of an ornamental device to eyeglasses by means of magnets.

U.S. Pat. No. 5,181,051 to D. R. Townsend et al teaches a magnetic removable display of magnetic printed matter.

OBJECTS AND ADVANTAGES OF THE INVENTION

It is an important object of the present invention to provide eyeglasses with one or more ceramic magnets that are arranged to project the north magnetic field into the surrounding area of one's eyes to improve blood circulation therein.

Another object of the invention is to provide ceramic magnets that can be selectively positioned on the frame of an eyeglass so as to stimulate a given area of the eye.

Still another object of the present invention is to provided a stimulating reaction by means of subjecting one's eye with the north magnetic field so as to increase oxygen in the surrounding surface tissue of the eye.

Yet another object of the invention is to increase the oxygen saturation of the red blood cells of the eye and surrounding area thereof which at the same time causes the cells to eliminate metabolic waste.

A further object of the invention is to provide a device of this character that stimulates the eye by means of a non-invasive method which has been found to lessen eye strain and headaches associated with eye strain.

A still further object of the invention is to provide an apparatus of this character that has no moving parts and wherein the magnets can be simply mounted either on the glass lenses or the frame structure so that the magnetic field can be positioned to establish a positive affect on a given area of the eye.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWING FIGURES

With the above and related objects in view, the invention consists in the details of construction and combination of parts, as will be more fully understood from the following description, when read in conjunction with the accompanying drawings and numbered parts in which:

FIG. 1 is a front perspective view of the present invention wherein a plurality of permanent magnets are mounted to the lenses of a pair of eyeglasses;

FIG. 2 is an enlarged view taken substantially along line 2—2 of FIG. showing a magnet mounted to the glass lens;

FIG. 3 is a rear perspective view of an eyeglass frame wherein a plurality of permanent magnets are shown mounted to the frame structure around the lens openings;

FIG. 4 is an enlarged cross-sectional view taken substantially along line 4—4 of FIG. 3 showing a magnet mounted within a recess formed in the frame member;

FIG. 5 is a perspective view of one portion of an eyeglass, wherein the frame member is shown as formed with an alternative arrangement; and FIG. 6 is an enlarged cross-sectional view of the eyeglass taken substantially along line 6—6 of FIG. 5.

DETAILED DESCRIPTION OF THE INVENTION

Referring now to the drawing in detail and more particularly to the views in FIGS. 1 and 2 thereof, there is illustrated a typical pair of eyeglasses, generally indicated at 10, that comprises a frame member 12 which defines a pair of side-by-side openings 14 separated by a space that allows the frame to rest on one's nose. Mounted within each opening 14 is a glass lens 16 that is supported within a peripheral recess 19. Temple side members 18 are hingedly attached at the respective outer portions of frame member 12 by means of hinge 20.

Fixedly attached to glass lenses 16 is a ceramic magnet 22 which can be mounted to the lens by one of two methods. One method would be gluing magnet 22 directly to the glass lens 16, as shown in FIG. 1, and the other method would be by first affixing a magnetic support member 24 to the lens by a suitable securing means such as glue or the like, as seen in more detail in the enlarged cross-sectional view of FIG. 2. Ceramic magnetic 22 is then magnetically attached to the fixed support member 24 formed from a suitable ferrous material. This particular mounting arrangement is preferred because support member 24 can be permanently attached to the lens. The position of the magnet or magnets is determined by the need and condition of the person's eyes, and thus the position of the magnet or magnets will not necessarily be that as illustrated in FIG. 1.

However, it is important that the south side (positive) is facing the glass lens, and the north side (negative) is facing outwardly, whereby the negative side will interact with the positive side of ceramic magnet 22. As is well known, opposite poles will always attract and this arrangement allows the ceramic magnet to be removed and replaced without mistakenly being mounted with the south magnetic pole of the magnet projecting outwardly in the direction of the eye.

A second embodiment is disclosed in FIGS. 3 and 4 in which a frame structure 12 is shown that is provided with one or more ceramic magnets 30. These magnets are fixedly mounted within frame 12 of eyeglass 10 by means of recesses 32 formed therein about openings 14 in selected positions as mentioned above. A magnet can also be located in temple members 18 adjacent the hinge portion thereof if need be, as illustrated in FIG. 3.

In FIGS. 5 and 6, there is shown a third embodiment which discloses an eyeglass frame 12 having a plurality of recesses 34 formed along the inner peripheral edge of opening 14. Recesses 34 have a substantially "C"-shape configuration that is defined by an opening 36 which itself is defined by a pair of extended flexible finger members 38. The finger members provide a gripping means for securely holding magnet 22 that is inserted therein as shown adjacent the four corner portions of the opening.

It may thus be seen that the objects of the present invention set forth herein, as well as those made apparent from the foregoing description, are efficiently attained. While the preferred embodiments of the invention have been set forth for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What I claim is:

1. An eyeglass frame structure having magnets selectively positioned thereon to define a non-invasive device so as to project a magnetic field into the surrounding area of one's eye or eyes so as to effectively improve the blood circulation within the eye or eyes subjected to the magnetic field and comprising:
    a frame member formed to define a pair of openings to receive lenses therein;
    a pair of temple members hingedly mounted to said frame member; and
    magnetic means having north and south magnetic poles mounted on said eyeglass frame structure, said magnetic means being arranged to project a north magnetic field in the direction of the eye to impinge on the eye, whereby the surrounding area thereof is stimulated by said north magnetic field; and
    means for attaching said magnetic means to said frame structure.

2. An eyeglass frame structure having magnets as recited in claim 1, wherein said magnetic means is defined by at least one ceramic magnet mounted to said frame member about said openings therein.

3. An eyeglass frame structure having magnets as recited in claim 2, wherein a plurality of ceramic magnets are selectively mounted to said frame member adjacent the peripheral edge of said openings in said frame member.

4. An eyeglass frame structure having magnets as recited in claim 3, wherein said attaching means comprises a plurality of recesses formed in said frame member adjacent the peripheral edge of said openings, wherein said ceramic magnets are fixedly secured in said recesses so said north pole of each said ceramic magnets faces each respective eye of the user thereof.

5. An eyeglass frame structure having magnets as recited in claim 3, wherein said attaching means comprises a plurality of recesses formed in said frame member adjacent the peripheral edge of said openings, said recesses being formed with an opening defined by a pair of flexible finger members that engage the ceramic magnet positioned within said recess, wherein each of said mounted ceramic magnets is arranged with the north pole thereof facing each respective eye of the user thereof.

6. An eyeglass frame structure having magnets as recited in claim 1, wherein said magnetic means is defined by at least one ceramic magnet mounted to at least one of said lenses.

7. An eyeglass frame structure having magnets as recited in claim 6, Wherein a plurality of ceramic magnets are selectively mounted to each of said lenses.

8. The method of providing a non-invasive stimulating action of an individual's eyes by means of subjecting the eyes to an increase in the oxygen content of the surrounding area of said eyes, said method comprises the steps of:
    mounting at least one magnet to a pair of eyeglasses;
    positioning said magnet, so that the north magnetic field of said magnet impinges on at least one of said eyes of the individual so as to increase the oxygen saturation of the red blood cells.

9. The method as recited in claim 8, including the step of: mounting said magnet so as to be selectively positioned on at least one lens of said eyeglasses.

10. The method as recited in claim 9, including the step of fixedly positioning a plurality of magnets on at least one lens of said eyeglasses, whereby said north magnetic field of said magnet impinges on at least one selected area of at least one of said eyes of the individual.

11. The method as recited in claim 9, including the step of mounting a plurality of magnets on the frame of said eyeglasses, wherein at least one of said eyes of the individual is selectively exposed to said north magnetic field of said magnet.

* * * * *